(12) United States Patent
Rahman

(10) Patent No.: US 7,958,386 B2
(45) Date of Patent: Jun. 7, 2011

(54) METHOD AND APPARATUS FOR PROVIDING A RELIABLE FAULT MANAGEMENT FOR A NETWORK

(75) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 546 days.

(21) Appl. No.: 11/955,171

(22) Filed: Dec. 12, 2007

(65) Prior Publication Data

US 2009/0158098 A1    Jun. 18, 2009

(51) Int. Cl.
G06F 11/00    (2006.01)

(52) U.S. Cl. .............................. 714/4; 714/48

(58) Field of Classification Search ............... 714/4, 48, 714/55
See application file for complete search history.

(56) References Cited

U.S. PATENT DOCUMENTS

| | | | | |
|---|---|---|---|---|
| 6,075,766 | A * | 6/2000 | Croslin | 370/225 |
| 6,215,867 | B1 * | 4/2001 | Eslambolchi | 379/229 |
| 6,269,396 | B1 * | 7/2001 | Shah et al. | 709/223 |
| 6,532,554 | B1 * | 3/2003 | Kakadia | 714/43 |
| 6,564,341 | B1 * | 5/2003 | Sundaram et al. | 714/43 |
| 6,697,970 | B1 * | 2/2004 | Chisholm | 714/48 |
| 6,731,625 | B1 * | 5/2004 | Eastep et al. | 370/352 |
| 6,792,469 | B1 * | 9/2004 | Callahan et al. | 709/231 |
| 6,810,496 | B1 * | 10/2004 | Vittal | 714/57 |
| 6,816,461 | B1 * | 11/2004 | Scrandis et al. | 370/242 |
| 6,853,887 | B1 * | 2/2005 | Greenwell | 701/1 |
| 7,130,870 | B1 * | 10/2006 | Pecina et al. | 1/1 |
| 7,167,723 | B2 * | 1/2007 | Zhang | 455/554.2 |
| 7,313,736 | B2 * | 12/2007 | Scrandis et al. | 714/47 |
| 7,366,989 | B2 * | 4/2008 | Naik et al. | 715/736 |
| 7,600,007 | B1 * | 10/2009 | Lewis | 709/223 |
| 7,693,079 | B2 * | 4/2010 | Cerami et al. | 370/241.1 |
| 7,702,959 | B2 * | 4/2010 | Hwang et al. | 714/38 |
| 2003/0126195 | A1 * | 7/2003 | Reynolds et al. | 709/203 |
| 2004/0261116 | A1 * | 12/2004 | Mckeown et al. | 725/109 |
| 2005/0086298 | A1 * | 4/2005 | Campbell et al. | 709/203 |
| 2005/0257100 | A1 * | 11/2005 | Anglin et al. | 714/48 |
| 2006/0020686 | A1 * | 1/2006 | Liss et al. | 709/219 |
| 2006/0077988 | A1 * | 4/2006 | Cheng et al. | 370/401 |
| 2006/0104214 | A1 * | 5/2006 | Borella | 370/252 |
| 2007/0155375 | A1 * | 7/2007 | Kappel et al. | 455/422.1 |
| 2007/0197206 | A1 * | 8/2007 | Olson et al. | 455/423 |
| 2007/0250608 | A1 * | 10/2007 | Watt | 709/222 |
| 2008/0095339 | A1 * | 4/2008 | Elliott et al. | 379/93.01 |
| 2008/0162199 | A1 * | 7/2008 | Smith et al. | 705/5 |
| 2008/0201462 | A1 * | 8/2008 | Liss et al. | 709/223 |
| 2009/0060495 | A1 * | 3/2009 | Wurst et al. | 398/16 |

* cited by examiner

Primary Examiner — Robert Beausoliel
Assistant Examiner — Joshua P Lottich

(57) ABSTRACT

A method and apparatus for providing reliable fault management for a network are disclosed. For example, a method receives one or more alarms from one or more network elements (NEs) by an element management system, and determines whether the one or more alarms need to be forwarded to a fault management platform (FMP) over a wireless data network. The method then forwards the one or more alarms over the wireless data network if it is determined that the one or more alarms need to be forwarded over the wireless data network.

19 Claims, 4 Drawing Sheets

METHOD AND APPARATUS FOR PROVIDING A RELIABLE FAULT MANAGEMENT FOR A NETWORK

The present invention relates generally to communication networks and, more particularly, to a method for providing a reliable fault management for a network, e.g., a packet network.

BACKGROUND OF THE INVENTION

Customers of network services expect to receive a high quality of service. However, the network used to provide such services, e.g., a Voice over Internet Protocol (VoIP) services, may occasionally experience a failure. The failure may be reported to an element management system. For example, either the failed network element or another network element in communication with the failed network element may report the fault to the element management system. The element management system may collect and forward fault reports to a centralized location. Network operations support personnel may access the fault reports at the centralized location and initiate remedies. However, a fault report may have to traverse over several data networks prior to reaching the centralized location. The network operations support personnel may then fail to receive a fault report if one of these data networks between the element management system and the centralized location experiences an outage. Hence, the network operations support personnel may not be able to initiate remedy steps in a timely manner. Frequent outages in a data network may result in frequent delays in repairs and decrease customer satisfaction with the subscribed service.

SUMMARY OF THE INVENTION

In one embodiment, the present invention discloses a method and apparatus for providing reliable fault management for a network. For example, a method receives one or more alarms from one or more network elements (NEs) by an element management system, and determines whether the one or more alarms need to be forwarded to a fault management platform (FMP) over a wireless data network. The method then forwards the one or more alarms over the wireless data network if it is determined that the one or more alarms need to be forwarded over the wireless data network.

In an alternate embodiment, a method sends a heartbeat signal by a fault management platform (FMP) to one or more element management systems (EMSs) over a wired data network in accordance with a predetermined schedule, and gathers one or more responses from the one or more element management systems (EMSs). The method then identifies one or more EMSs that are non-responsive, and communicates with the one or more EMSs identified as non-responsive via a wireless data network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a reliable fault management for a packet network, e.g., an Internet Protocol (IP) network, a Voice over Internet Protocol (VoIP) network, etc.

Figure 1:
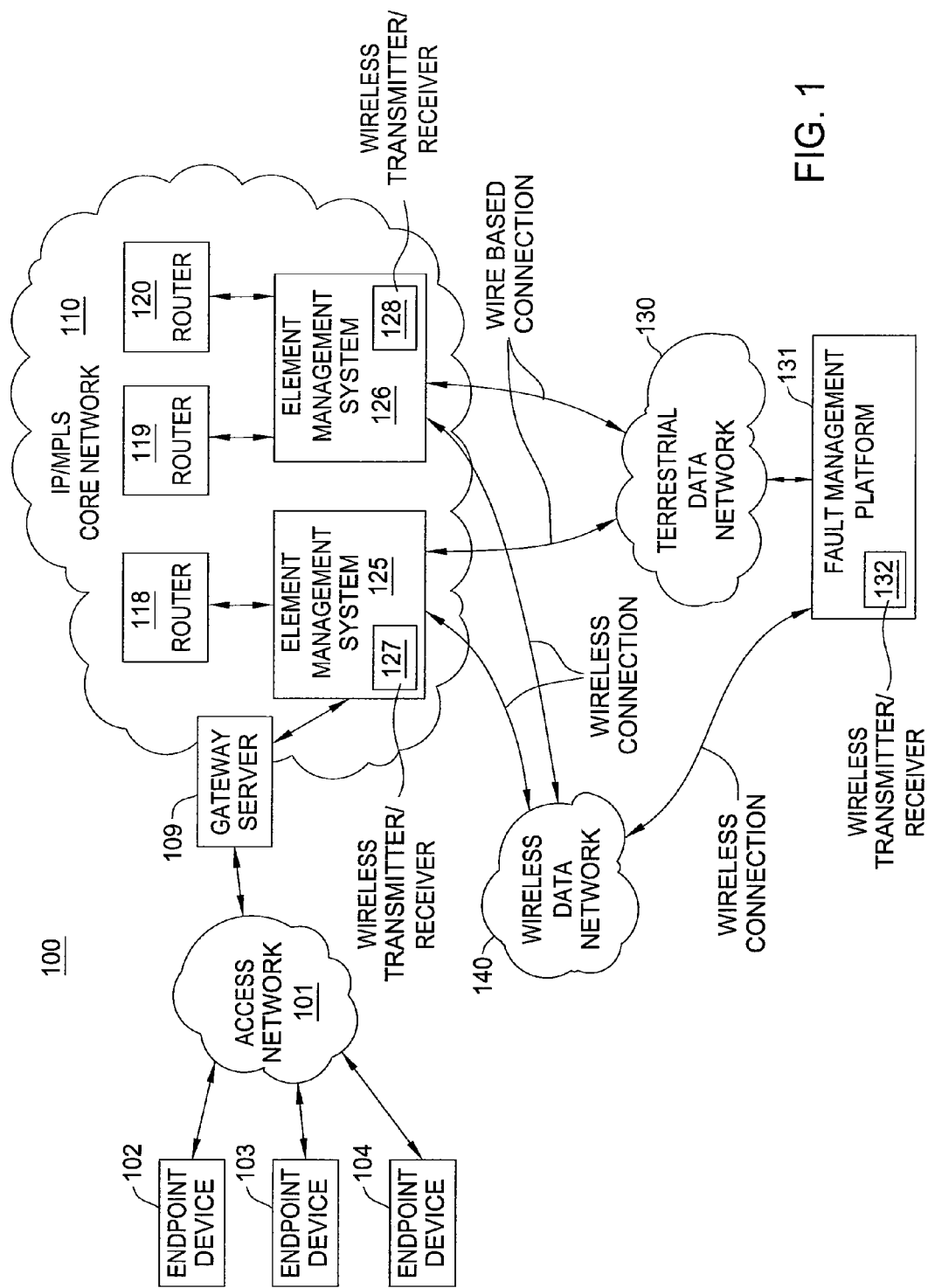
FIG. 1 illustrates an exemplary network of the current invention for providing a reliable fault management for a network.

FIG. 1 illustrates an exemplary network 100 of the current invention for providing a reliable fault management for a network. In one embodiment, the network comprise a plurality of endpoint devices 102-104 configured for communication with a core packet network 110 (e.g., an IP based core backbone network supported by a service provider) via an access network 101. The network element 109 may serve as a gateway server or edge router for the network 110. The gateway server may also be referred to as a border element.

The endpoint devices 102-104 may comprise customer endpoint devices such as personal computers, laptop computers, Personal Digital Assistants (PDAs), servers, routers, and the like. The access network 101 serves as a means to establish a connection between the customer endpoint devices 102-104 and the NE 109 of the IP/MPLS core network 110. The access network 101 may comprise a Digital Subscriber Line (DSL) network, a broadband cable access network, a Local Area Network (LAN), a Wireless Access Network (WAN), a $3^{rd}$ party network, and the like. The access network 101 is connected to NE 109 of the IP/MPLS core network 110. The packets from customer endpoint devices 102-104 (traveling towards the IP/MPLS core network 110) traverse the access network 101 to reach the border element 109.

Some NEs (e.g., NE 109) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The NEs (e.g. NE 109, 118, 119, 120) may be locally managed by an Element Management Systems (EMS) 125 or 126. In FIG. 1, the EMS 125 is used to manage NEs 109 and 118, and EMS 126 is used to manage NEs 119 and 120. The EMSs 125 and 126 may collect alarm data for their corresponding NEs, and forward the alarm data to a centralized location such as a Fault Management Platform (FMP) 131. Network operations support personnel may obtain alarms, status, fault reports, etc. and initiate remedies by accessing the FMP 131. However, the alarm data from an EMS (e.g. EMS 125 or 126) may traverse several data networks prior to reaching the FMP 131. The network operations support personnel may not receive the alarm data if one of the data networks between the EMS and the FMP experiences an outage.

In one embodiment, the current invention enables the EMSs to communicate via both wire based and wireless data networks. For example, the EMSs 125 and 126 may be equipped with wireless transceivers 127 and 128, as shown in FIG. 1, as well as the wire based input/output ports. The EMSs 125 and 126 may then be connected to a terrestrial data network 130 using a wire based connection, e.g., fiber optic, copper wire, etc. The EMSs 125 and 126 may also be connected to a wireless data network 140 using a wireless transceiver 127 or 128.

In one embodiment, the current invention enables the Fault Management Platform (FMP) 131 to communicate via both wire-based and wireless data networks. For example, the FMP 131 may be equipped with a wireless transceiver 132, as shown in FIG. 1, as well as the wire based input/output ports for communication with the terrestrial data network 130. The FMP 131 may then be connected to the terrestrial data network 130 and the wireless data network 140 for communicating with EMSs 125 and 126. The EMSs 125 and 126 may then gather alarms for their corresponding NEs and forward the alarms to the FMP 131 via the terrestrial data network 130 or the wireless data network 140.

In one embodiment, the current invention enables an EMS to determine whether or not the alarms gathered from the NEs need to be forwarded to the FMP over a wireless data network. In one example, the EMS may be receiving a heartbeat signal from the FMP in accordance with a predetermined schedule, e.g., every 15 minutes, every hour, and so on. In one embodiment, the network service provider will configure the predetermined schedule based upon the fault management needs of the network. The heartbeat signal is received via a wired network, e.g., the terrestrial data network 130. The heartbeat signal may or may not require a response from the EMS. One purpose of the heartbeat signal is to allow the EMS to recognize that its connection with the FMP is operational and functioning properly. However, if the EMS did not receive a heartbeat signal in accordance with the predetermined schedule, then the EMS may utilize the wireless data network. For example, the EMS may send an inquiry message to the FMP via the wired network 130 and/or the wireless data network 140.

In another example, the EMS may actually detect a failure of its connection to the terrestrial data network 130. In this scenario, the EMS will simply use the wireless data network to communicate with the FMP.

In one example, the EMS may have received a notice or an instruction from the FMP indicating that the FMP is not able to communicate via the terrestrial data network. For example, the wired connection between the FMP and the terrestrial data network may have failed or the terrestrial data network is scheduled for maintenance or upgrades. Given such advanced notices, the EMS may then send the alarm data over the wireless data network 140 instead of the wired data network 130.

In one embodiment, the current invention may optionally send the alarms over both the wireless data network and the terrestrial data network. For example, a network service provider may prefer receiving the alarms on both the wireless and terrestrial data networks as opposed to just over the wireless data network.

In one embodiment, the current invention enables the FMP to determine whether or not it needs to communicate with one or more EMSs over a wireless data network. For example, the FMP may send heartbeat signals to the EMSs over the terrestrial data network in a predetermined schedule. The FMP then may gather responses and identify one or more EMSs that are non-responsive. The FMP may then begin communicating with the non-responsive EMSs via the wireless data network. This redundancy allows the FMP to maintain communications with its EMSs to ensure reliability. It should be noted that the FMP may continue to send the heartbeat signals to the non-responsive EMSs via the wired data network 130, in order to determine whether or not the connections via the terrestrial data network to the non-responsive EMSs are restored.

Those skilled in the art will realize that the communication system 100 may be expanded by including additional endpoint devices, access networks, border elements, data networks, etc. without altering the present invention. As such, the illustrative example is not intended to limit the present invention.

Figure 2:
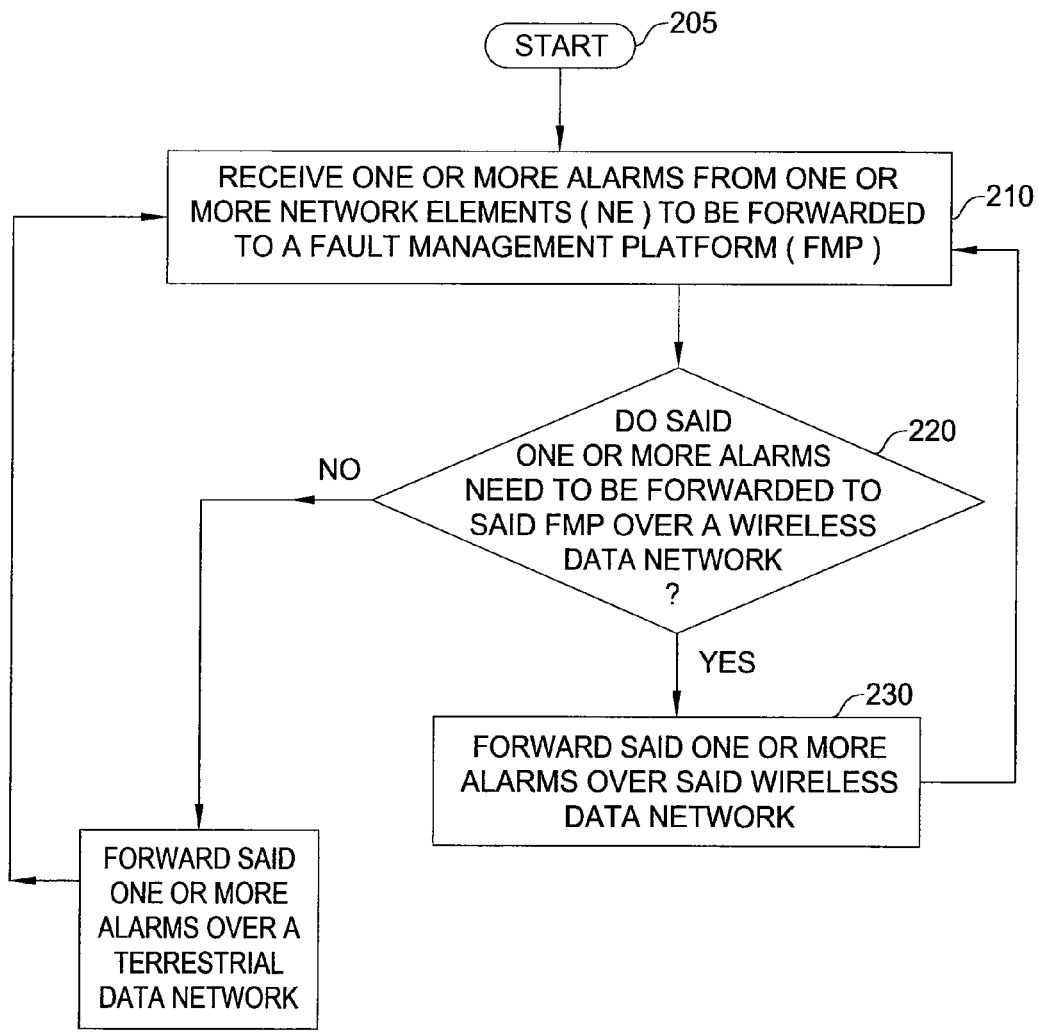
FIG. 2 illustrates a flowchart of a method for providing a reliable fault management for a network by an element management system.

FIG. 2 illustrates a flowchart of a method 200 for providing reliable fault management for a network. For example, method 200 can be employed by an element management system. Method 200 starts in step 205 and proceeds to step 210.

In step 210, method 200 receives one or more alarms from one or more Network Elements (NE) to be forwarded to a Fault Management Platform (FMP). For example, an Element Management System (EMS) being used to locally gather alarms from a plurality of network elements receives one or more alarms from the network elements that it manages.

In step 220, method 200 determines whether or not said one or more alarms need to be forwarded to the FMP over a wireless data network. For example, the EMS may fail to receive a heartbeat signal from the FMP within a predetermined schedule. For example, if a heartbeat signal is expected every 30 minutes and the last heartbeat signal was received from the FMP more than 45 minutes ago, then the EMS may determine that the alarms need to be forwarded over the wireless data network. Other triggering mechanism as discussed above for sending the alarms over the wireless data network instead of the wired data network can be employed. If the method determines that the alarms need to be forwarded to the FMP over the wireless data network, the method proceeds to step 230. Otherwise, the method proceeds to step 240.

In step 230, method 200 forwards the one or more alarms over the wireless data network. For example, the EMS sends the alarms using its wireless transmitter. The method then returns to step 210.

In one embodiment, after step 230 the method 200 may optionally proceed to step 240 where the alarms that were sent over a wireless data network are also sent over a terrestrial data network.

In step 240, method 200 forwards the one or more alarms over a terrestrial data network. For example, the EMS uses its wire based connection, e.g., input/output port to fiber optic lines or copper wire lines, to forward the alarms towards the FMP. The method then returns to step 210.

Figure 3:
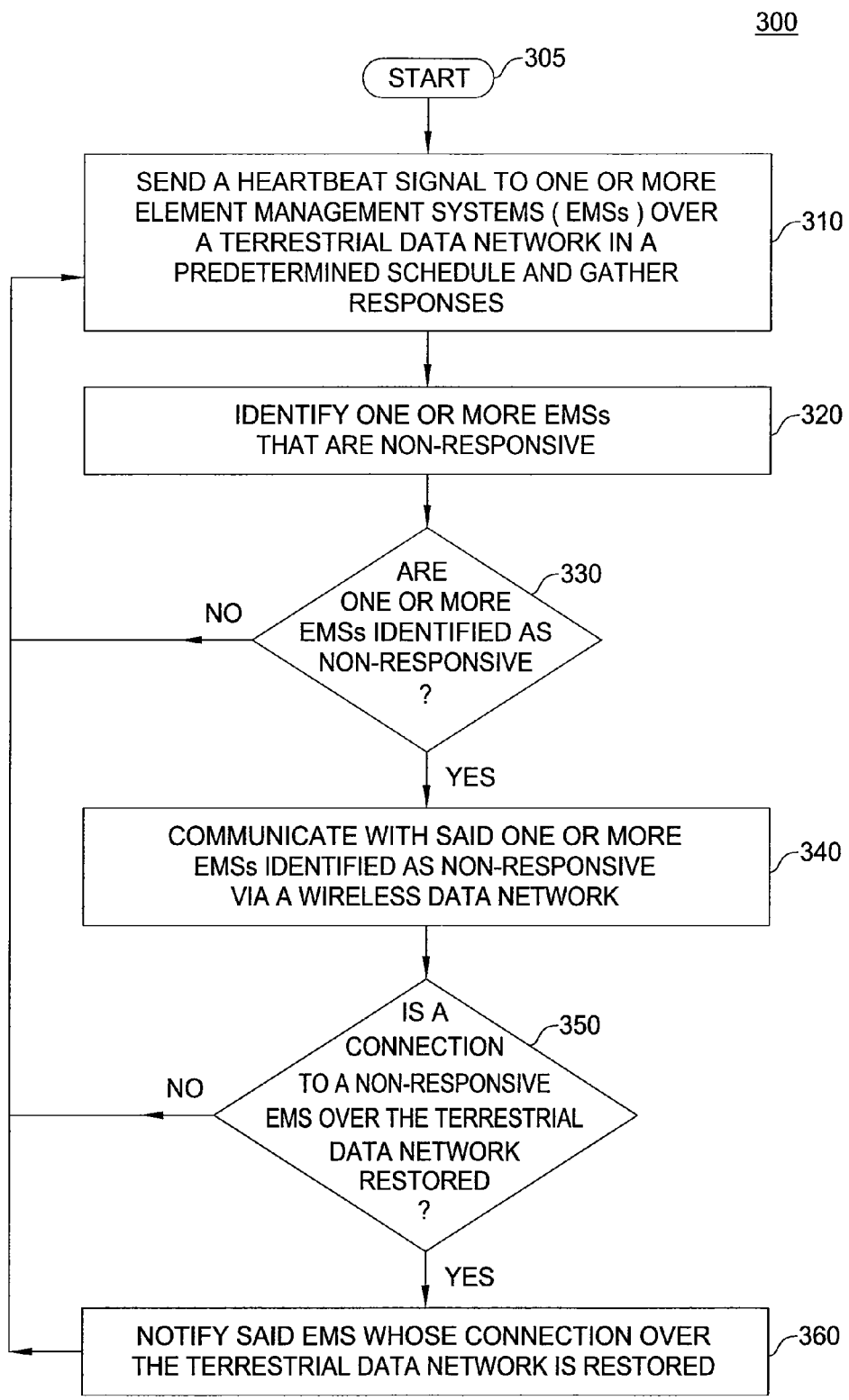
FIG. 3 illustrates a flowchart of a method for a fault management platform to provide a reliable fault management for a network.

FIG. 3 illustrates a flowchart of a method 300 for providing reliable fault management for a network. For example, method 300 can be deployed by a fault management platform. Method 300 starts in step 305 and proceeds to step 310.

In step 310, method 300 sends a heartbeat signal to one or more EMSs over a terrestrial data network in a predetermined schedule. In one embodiment, the FMP also gathers responses from the EMSs, if the heartbeat signal is a type of signal that requires a response from the EMSs. For example, a Fault Management Platform (FMP) may send a heartbeat signal every 30 minutes and gathers responses to the heartbeat signals.

In step 320, method 300 identifies one or more EMSs that are non-responsive. For example, the method may identify an EMS or a set of EMSs communicating via a particular terrestrial data network as non-responsive, i.e., no reply is received from an EMS. For example, the lack of response may be due to a failure of a terrestrial data network.

In step 330, method 300 determines whether or not one or more EMSs are identified as non-responsive. If there are no EMSs identified as non-responsive, then the method proceeds back to step 310. Otherwise, the method proceeds to step 340.

In step 340, method 300 communicates with the one or more EMSs identified as non-responsive via a wireless data network. For example, the FMP may use the connection over the wireless data network to send a notification to the non-responsive EMSs instructing them to forward any alarm data over the wireless data network instead of the wired data network.

In step 350, method 300 determines whether or not the connection to a non-responsive EMS over the terrestrial data network is restored. For example, the FMP may simply continue to send heartbeat signals in accordance with the predetermined schedule to determine when a non-responsive EMS begins responding. Alternatively, the FMP may simply receive a notification from the wired data network that the failure has been resolved such that the wired data network is again operational. Namely, the failure in the terrestrial data network may be remedied and the wired data network may become operational after a period of time. If the method determines that the connection to a non-responsive EMS is restored, the method proceeds to step 360. Otherwise, the method proceeds to step 310.

In step 360, method 300 notifies the corresponding EMSs whose connection over the terrestrial data network has been restored. For example, the FMP may inform the previously affected EMSs to again use the wired data network for transmission of alarms associated with network elements. The method then proceeds back to step 310 to continue sending heartbeat signals and gathering responses.

It should be noted that although not specifically specified, one or more steps of methods 200 and 300 may include a storing, displaying and/or outputting step as required for a particular application. In other words, any data, records, fields, and/or intermediate results discussed in the methods 200 and 300 can be stored, displayed and/or outputted to another device as required for a particular application. Furthermore, steps or blocks in FIG. 2 and FIG. 3 that recite a determining operation or involve a decision, do not necessarily require that both branches of the determining operation be practiced. In other words, one of the branches of the determining operation can be deemed as an optional step.

Figure 4:
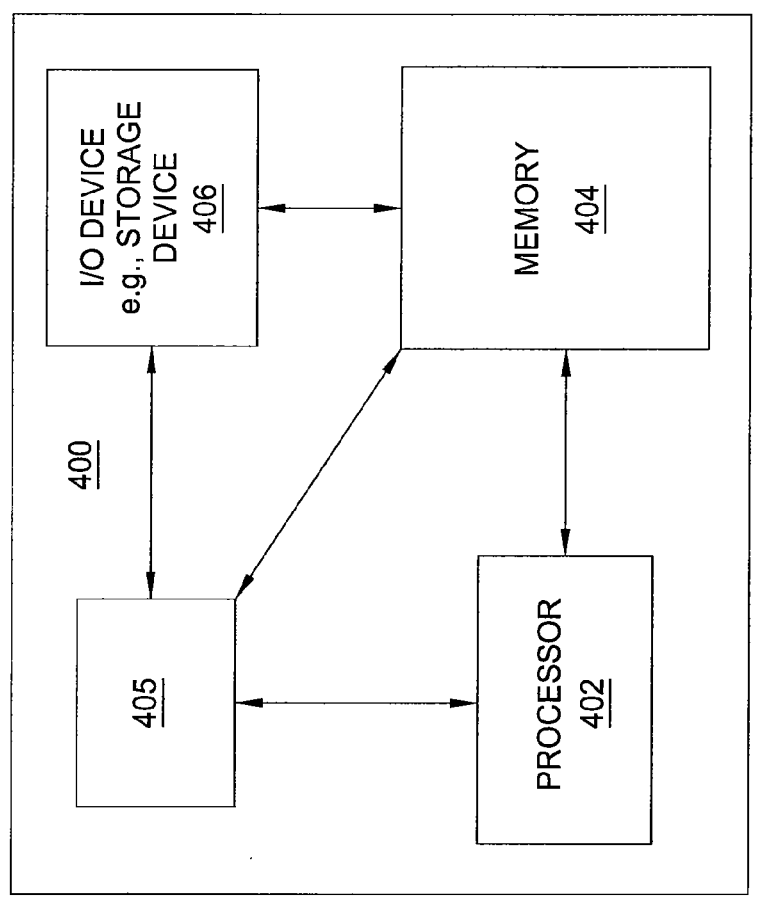
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing reliable fault management for a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 405 for providing reliable fault management for a network can be loaded into memory 404 and executed by processor 402 to implement the functions as discussed above. As such, the present method 405 for providing reliable fault management for a network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing fault management for a network, comprising:
   receiving an alarm from a network element by an element management system;
   determining whether the alarm needs to be forwarded to a fault management platform over a wireless data network, wherein the determining comprises receiving an instruction from the fault management platform to use the wireless data network; and
   forwarding the alarm over the wireless data network if it is determined that the alarm needs to be forwarded over the wireless data network.

2. The method of claim 1, further comprising:
   forwarding the alarm that was sent over the wireless data network over a wired data network to the fault management platform.

3. The method of claim 1, wherein the determining comprises determining whether a heartbeat signal has been received from the fault management platform in accordance with a predetermined schedule.

4. The method of claim 3, wherein the predetermined schedule for sending the heartbeat signal is configurable by a network service provider.

5. The method of claim 1, wherein the determining comprises detecting a failure of a wired data network.

6. The method of claim 1, wherein the network is a packet network.

7. The method of claim 1, wherein the determining comprises detecting a failure of a connection to the wired data network.

8. A computer-readable medium having stored thereon a plurality of instructions, the plurality of instructions including instructions which, when executed by a processor, cause the processor to perform a method for providing fault management for a network, comprising:
   receiving an alarm from a network element by an element management system;
   determining whether the alarm needs to be forwarded to a fault management platform over a wireless data network, wherein the determining comprises receiving an instruction from the fault management platform to use the wireless data network; and
   forwarding the alarm over the wireless data network if it is determined that the alarm needs to be forwarded over the wireless data network.

9. The computer-readable medium of claim 8, further comprising:
   forwarding the alarm that was sent over the wireless data network over a wired data network to the fault management platform.

10. The computer-readable medium of claim 8, wherein the determining comprises determining whether a heartbeat signal has been received from the fault management platform in accordance with a predetermined schedule.

11. The computer-readable medium of claim 10, wherein the predetermined schedule for sending the heartbeat signal is configurable by a network service provider.

12. The computer-readable medium of claim 8, wherein the determining comprises detecting a failure of a wired data network.

13. The computer-readable medium of claim 8, wherein the determining comprises detecting a failure of a connection to the wired data network.

14. The computer-readable medium of claim 8, wherein the network is a packet network.

15. A method for providing fault management for a network, comprising:

sending a heartbeat signal by a fault management platform to a plurality of element management systems over a wired data network in accordance with a predetermined schedule;

gathering responses from the element management systems;

identifying an element management system of the plurality of element management systems that is non-responsive;

communicating with the element management system identified as non-responsive via a wireless data network;

determining a connection to the element management system identified as non-responsive over the wired data network is restored; and notifying the element management system identified as non-responsive that the connection over the wired data network is restored.

16. The method of claim 15, wherein the determining the connection is restored comprises sending the heartbeat signal periodically over the connection.

17. The method of claim 15, wherein the network is a packet network.

18. The method of claim 15, wherein each of the plurality of element management systems receives an alarm from a network element.

19. The method of claim 18, wherein the alarm is received from the plurality of element management systems via the wireless data network.

* * * * *